United States Patent
Peng et al.

(10) Patent No.: US 9,411,603 B2
(45) Date of Patent: Aug. 9, 2016

(54) CHIP AND STARTING METHOD THEREOF

(71) Applicant: Huawei Technologies Co., Ltd., Shenzhen (CN)

(72) Inventors: Kang Peng, Shenzhen (CN); Hongwei Yang, Shenzhen (CN); Can Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 14/562,236

(22) Filed: Dec. 5, 2014

(65) Prior Publication Data

US 2015/0160946 A1 Jun. 11, 2015

(30) Foreign Application Priority Data

Dec. 6, 2013 (CN) .......................... 2013 1 0656271

(51) Int. Cl.
 *G06F 15/177* (2006.01)
 *G06F 9/44* (2006.01)
(52) U.S. Cl.
 CPC ................ *G06F 9/4401* (2013.01); *G06F 8/30* (2013.01)
(58) Field of Classification Search
 CPC .................................................. G06F 9/4401
 See application file for complete search history.

(56) References Cited

U.S. PATENT DOCUMENTS

| | | | | |
|---|---|---|---|---|
| 5,930,704 A | * | 7/1999 | Kay | ...................... G06F 9/4401 375/E1.002 |
| 6,643,772 B1 | * | 11/2003 | Aguilar | ................. G06F 9/4416 713/2 |
| 7,415,603 B2 | * | 8/2008 | Woundy | .............. G06F 9/44505 713/1 |
| 2003/0236970 A1 | * | 12/2003 | Palmer | ...................... G06F 8/65 713/1 |
| 2008/0270777 A1 | | 10/2008 | Thomas et al. | |
| 2008/0270797 A1 | | 10/2008 | Thomas et al. | |
| 2009/0034543 A1 | | 2/2009 | Thomas et al. | |
| 2009/0037717 A1 | | 2/2009 | Hanes | |
| 2009/0119658 A1 | | 5/2009 | Thoon et al. | |
| 2014/0040607 A1 | * | 2/2014 | Murray | ..................... G06F 8/60 713/2 |

FOREIGN PATENT DOCUMENTS

| | | |
|---|---|---|
| CN | 1996251 A | 7/2007 |
| CN | 101907997 A | 12/2010 |
| CN | 103135997 A | 6/2013 |

OTHER PUBLICATIONS

Partial English Translation and Abstract of Chinese Patent Application No. CN1996251, May 6, 2016, 20 pages.

(Continued)

*Primary Examiner* — Mark Connolly
(74) *Attorney, Agent, or Firm* — Conley Rose, P.C.; Grant Rodolph

(57) ABSTRACT

A starting method including, after being powered on, obtaining, by a central processing unit (CPU), a boot image file, where the boot image file includes universal boot code and differentiating boot code, the universal boot code is obtained by compiling a universal part in boot code of different chips, the universal boot code includes a first boot code segment and a second boot code segment; reading the first boot code segment from the boot image file, running the first boot code segment, and reading indication information of the differentiating boot code; reading, from the boot image file, the differentiating boot code according to the indication information of the differentiating boot code, and running the differentiating boot code; and running the second boot code segment, to complete booting of the chip to which the CPU belongs.

12 Claims, 3 Drawing Sheets

(56) References Cited

OTHER PUBLICATIONS

Partial English Translation and Abstract of Chinese Patent Application No. CN101907997, May 6, 2016, 6 pages.

Ke, J., "Design of monitor and control system for urban rail converter based on PowerPC," Sep. 15, 2011, 7 pages.

English Translation of Ke, J., "Design of monitor and control system for urban rail converter based on PowerPC," Mar. 9, 2016, 3 pages.

Foreign Communication From a Counterpart Application, Chinese Application No. 201310656271.8, Chinese Office Action dated Apr. 1, 2016, 8 pages.

* cited by examiner

CHIP AND STARTING METHOD THEREOF

CROSS-REFERENCE TO RELATED APPLICATION

This application claims priority to Chinese Patent Application No. 201310656271.8, filed on Dec. 6, 2013, which is hereby incorporated by reference in its entirety.

TECHNICAL FIELD

Embodiments of the present invention relate to embedded technologies, and in particular, to a chip and a starting method thereof.

BACKGROUND

In an embedded system, a central processing unit (CPU) and a double data rate synchronous dynamic random access memory (DDR SDRAM or DDR) need to be initialized using a board (especially, a boot formed on the board), and an operating system such as Linux can be started only after the CPU and the DDR are initialized.

Currently, a universal procedure for starting a chip including a CPU includes that, after being powered on, a CPU reads an instruction from a start location in a specified storage medium, to initialize hardware such as the CPU and a DDR; and then the CPU copies code in boot and an operating system (OS) to a specified location in the DDR and runs the code. In the foregoing solution, initialization configurations of the hardware such as the CPU and the DDR are all saved in boot code, and cannot be modified after compilation unless recompiled.

When software is developed for a series of chips, due to differences in design of different chips, boot code needs to be compiled for each type of chip, and even for two slightly different types of chips of a same company, different branches need to be designed in code. As the number of newly developed chips is increasing, maintenance costs are increasing, and an error probability is also increasing.

SUMMARY

In view of this, embodiments of the present invention provide a chip and a starting method thereof, which are used to resolve problems of high maintenance costs and a high error probability of boot code in the prior art.

According to a first aspect, a method for starting a chip is provided and includes, after being powered on, obtaining, by a CPU, a boot image file, where the boot image file includes universal boot code and differentiating boot code, the universal boot code is obtained by compiling a universal part in boot code of different chips, the universal boot code includes a first boot code segment and a second boot code segment, and the differentiating boot code is obtained by compiling a differentiating part that is in boot code of a chip to which the CPU belongs and differentiates the chip from other chips; reading, by the CPU, the first boot code segment from the boot image file, and running the first boot code segment; reading, by the CPU and from the first boot code segment, indication information of the differentiating boot code; reading, by the CPU and from the boot image file, the differentiating boot code according to the indication information of the differentiating boot code, and running the differentiating boot code; and running, by the CPU, the second boot code segment, to complete booting of the chip to which the CPU belongs.

With reference to the first aspect, in a first possible implementation manner of the first aspect, the differentiating boot code is at least used to initialize a DDR, and after the reading and running the differentiating boot code, the method further includes completing, by the DDR, initialization according to the run differentiating boot code; and the running, by the CPU, the second boot code segment includes, after the DDR is initialized, reading, by the CPU, the second boot code segment to the DDR, and running the second boot code segment.

With reference to the first possible implementation manner of the first aspect, in a second possible implementation manner of the first aspect, the second boot code segment includes indication information of an OS image file, and the OS image file is used to start an OS; the reading, by the CPU, the second boot code segment to the DDR, and running the second boot code segment includes obtaining, by the CPU and from the second boot code segment, the indication information of the OS image file; and after the reading, by the CPU, the second boot code segment to the DDR, and running the second boot code segment, the method further includes reading, by the CPU, the OS image file to the DDR according to the indication information of the OS image file, and running the OS image file.

With reference to the first possible implementation manner of the first aspect, in a third possible implementation manner of the first aspect, before the running, by the CPU, the second boot code segment, the method further includes, after the DDR is initialized, reading, by the CPU, the first boot code segment, the differentiating boot code, and the second boot code segment to the DDR, to jointly complete the booting of the chip to which the CPU belongs.

With reference to the first aspect or any one of the first to third possible implementation manners of the first aspect, in a fourth possible implementation manner of the first aspect, the first boot code segment and the second boot code segment are stored non-contiguously, and the differentiating boot code is stored in a place between the first boot code segment and the second boot code segment; or the first boot code segment and the second boot code segment are stored contiguously.

According to a second aspect, a chip is provided and includes a CPU configured to, after being powered on, obtain a boot image file, where the boot image file includes universal boot code and differentiating boot code, the universal boot code is obtained by compiling a universal part in boot code of different chips, the universal boot code includes a first boot code segment and a second boot code segment, and the differentiating boot code is obtained by compiling a differentiating part that is in boot code of the chip to which the CPU belongs and differentiates the chip from other chips; read the first boot code segment from the boot image file, and run the first boot code segment; read, from the first boot code segment, indication information of the differentiating boot code; read, from the boot image file, the differentiating boot code according to the indication information of the differentiating boot code, and run the differentiating boot code; and run the second boot code segment, to complete booting of the chip to which the CPU belongs.

With reference to the second aspect, in a first possible implementation manner of the second aspect, the differentiating boot code is at least used to initialize a DDR, and the chip further includes a DDR configured to complete initialization according to the run differentiating boot code; and the CPU is configured to, after the DDR is initialized, read the second boot code segment to the DDR and run the second boot code segment.

With reference to the first possible implementation manner of the second aspect, in a second possible implementation manner of the second aspect, the second boot code segment includes indication information of an OS image file, and the OS image file is used to start an OS; and the CPU is configured to obtain, from the second boot code segment, the indication information of the OS image file, read the OS image file to the DDR according to the indication information of the OS image file, and run the OS image file.

With reference to the first possible implementation manner of the second aspect, in a third possible implementation manner of the second aspect, the CPU is further configured to, after the DDR is initialized, read the first boot code segment, the differentiating boot code, and the second boot code segment to the DDR, to jointly complete booting of the chip to which the CPU belongs.

With reference to the second aspect or any one of the first to third possible implementation manners of the second aspect, in a fourth possible implementation manner of the second aspect, the first boot code segment and the second boot code segment are stored non-contiguously, and the differentiating boot code is stored in a place between the first boot code segment and the second boot code segment; or the first boot code segment and the second boot code segment are stored contiguously.

According to the foregoing technical solutions, for different chips, differentiating code is separated from boot code, and only universal code of the different chips is saved in the boot code. In this way, chips in a same product field or even multiple types of chips of a same manufacturer can share a same piece of boot code. Therefore, the number of pieces of to-be-maintained code is reduced, maintenance costs are reduced, and an error probability is reduced.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
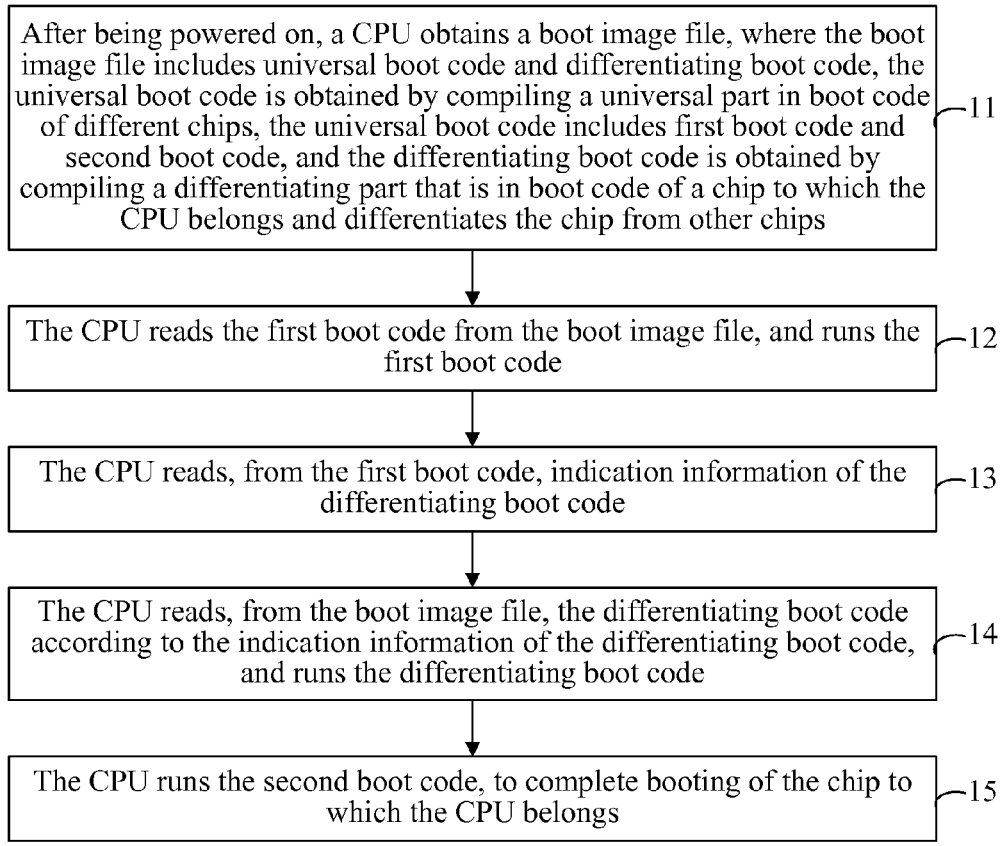
FIG. 1 is a schematic flowchart of a method for starting a chip according to an embodiment of the present invention.

FIG. 1 is a schematic flowchart of a method for starting a specific chip according to an embodiment of the present invention, which includes the following steps:

11: After being powered on, a CPU obtains a boot image file, where the boot image file includes universal boot code and differentiating boot code.

The universal boot code is obtained by compiling a universal part in boot code of the specific chip. In the present invention, the universal part of the boot code refers to universal code in the boot code and applicable to multiple types of chips. In actual products, boot image files corresponding to different chips always include a universal boot code segment with same content or a same function. In this embodiment of the present invention, the universal code segment with the same content or the same function is extracted as the universal boot code.

The universal boot code includes a first boot code segment and a second boot code segment, and the differentiating boot code is obtained by compiling a differentiating part that is in the boot code of the chip to which the CPU belongs and differentiates the chip from other chips.

In this embodiment of the present invention, each chip includes a CPU, each chip has a corresponding boot image file, and each CPU can read a boot image file corresponding to a chip including the CPU. In the prior art, a boot image file includes code obtained by compiling boot code, where the boot code not only includes universal code of different chips, but also includes differentiating code among different chips.

However, in this embodiment of the present invention, the universal boot code included in the boot image file is obtained by compiling a universal part in boot code of different chips, for example, obtained by compiling a universal part in boot code of existing chips; and the differentiating boot code is obtained by compiling a differentiating part that is in the boot code of the chip to which the CPU belongs and differentiates the chip from other chips, for example, if the chip to which the CPU belongs is a chip A, the differentiating boot code in the boot image file obtained by the CPU is obtained by compiling a differentiating part that is in boot code of the chip A and differentiates the chip A from other chips. The differentiating boot code may also be referred to as a binary file. Therefore, in this embodiment of the present invention, for different chips, differentiating code may be separated from boot code, and the differentiating code is compiled to form an independent binary file; and only universal code of the different chips is saved in the boot code, and the saved universal code of the different chips is compiled, to obtain boot code.

Figure 2:
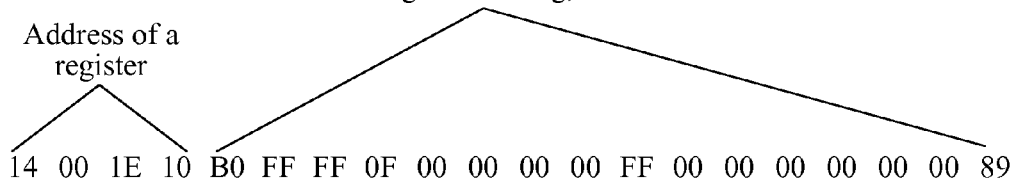
FIG. 2 is a schematic structural diagram of differentiating boot code according to an embodiment of the present invention.

The differentiating code (or the differentiating part that is in the boot code of the chip to which the CPU belongs and differentiates the chip from other chips) refers to code of one chip different from that of other chips. For example, referring to FIG. 2, the left part represents an address of a register, and the right part represents operations that need to be performed, and after being compiled, the code may form the foregoing binary file (or referred to as differentiating boot code).

The universal code (or referred to as the universal part in boot code of different chips) refers to common code of different chips. Universal code and differentiating code may be configured according to different manufacturers and different series of chips. Generally, universal code is standard code defined by a manufacturer or a universal module of a series of chip, for example, code used to enable and/or initialize a standardized interface such as a serial port, a network port, or a universal serial bus (USB) interface, and differentiating code refers to code configured for a chip except universal code.

In addition, the universal boot code in this embodiment of the present invention may be divided into two parts, which may be referred to as a first boot code segment and a second boot code segment. During storage, the first boot code segment and the second boot code segment may be stored contiguously, and may form a continuous stored whole; or during storage, the first boot code segment and the second boot code segment may be stored non-contiguously, and the differentiating boot code is located in a place between the first boot code segment and the second boot code segment.

12: The CPU reads the first boot code segment from the boot image file, and runs the first boot code segment.

Indication information of the differentiating boot code is recorded in the first boot code segment, and the differentiating boot code in the boot image file may be obtained by running the first boot code segment. In this embodiment of the present invention, the indication information may be information about a location of the differentiating boot code, information about a command used to invoke the differentiating boot code, or information about a parameter used to lock and run the differentiating boot code. The first boot code segment may be construed as an entry file of the boot image file, where the entry file is used to preliminarily read the boot image file to complete preliminary configuration of the CPU.

13: The CPU reads, from the first boot code segment, the indication information of the differentiating boot code.

Because information about the binary file is recorded in the first boot code segment, the indication information of the differentiating boot code may be obtained according to the run first boot code segment.

14: The CPU reads, from the boot image file, the differentiating boot code according to the indication information of the differentiating boot code, and runs the differentiating boot code.

The differentiating boot code is obtained by compiling differentiating code that is of the chip to which the CPU belongs and differentiates the chip from other chips, and is used for configuration of some hardware, where the hardware configuration at least includes initialization of a DDR, and may also be used for mode switching of the CPU, configuration of a general-purpose register, initialization of a flash controller, and the like.

Initialization of a DDR may be completed by reading and running the differentiating boot code, where the initialization of the DDR may include, for example, initialization of a DDR controller and initialization of a DDR physical interface (DDR PHY). The initialization of the DDR controller includes, for example, configuration of a time sequence of control interfaces, configuration of reading, writing, and access time sequences, configuration of a low power consumption setting, and configuration of a self refresh setting. The initialization of the DDR PHY includes, for example, matching of a reference clock and a data sampling clock.

15: The CPU runs the second boot code segment, to complete booting of the chip to which the CPU belongs. Optionally, after the differentiating boot code is read and run, initialization of a DDR may be completed, that is, after step 14, the method may further include completing, by the DDR, initialization according to the run differentiating boot code; and the running, by the CPU, the second boot code segment includes, after the DDR is initialized, reading, by the CPU, the second boot code segment to the DDR, and running the second boot code segment.

Optionally, the second boot code segment includes indication information of an OS image file, and the OS image file is used to start an OS; the reading, by the CPU, the second boot code segment to the DDR, and running the second boot code segment includes reading, by the CPU and from the second boot code segment, the indication information of the OS image file; and after the reading, by the CPU, the second boot code segment to the DDR, and running the second boot code segment, the method further includes reading, by the CPU, the OS image file to the DDR according to the indication information of the OS image file, and running the OS image file. Then, the OS may be started.

Optionally, the boot image file and the OS image file may be stored in a flash. The image files (including the boot image file and the OS image file) in this embodiment of the present invention refer to code that has undergone compilation and can be run in the CPU.

In this embodiment, for different chips, differentiating code is separated from boot code, and only universal code of the different chips is saved in the boot code. In this way, chips in a same product field or even multiple types of chips of a same manufacturer can share a same piece of boot code. Therefore, the number of pieces of to-be-maintained code is reduced, maintenance costs are reduced, and an error probability is reduced.

Figure 3:
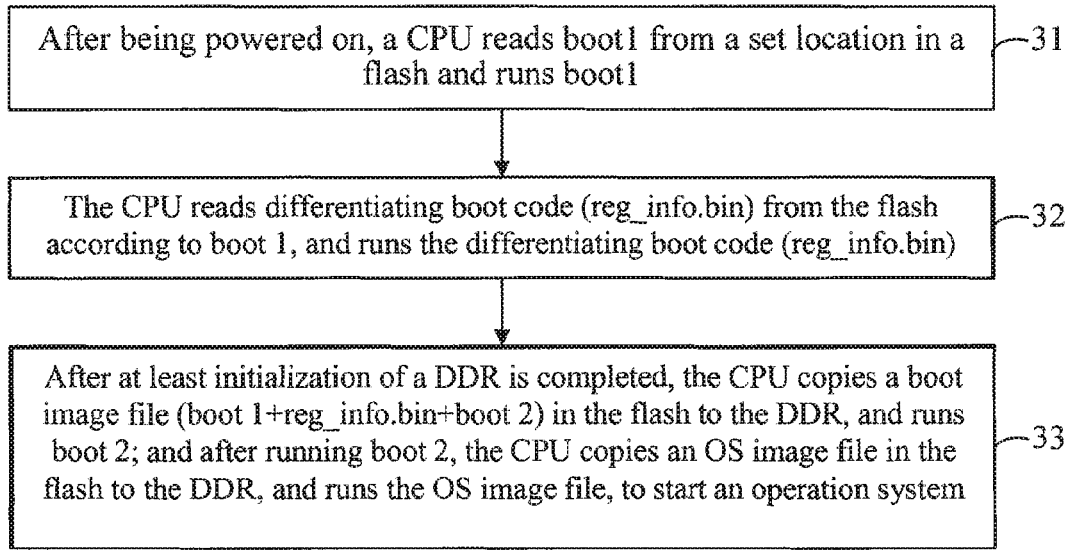
FIG. 3 is a schematic flowchart of another method for starting a chip according to an embodiment of the present invention.

FIG. 3 is a schematic flowchart of another method for starting a chip according to an embodiment of the present invention. In this embodiment, that boot code is divided into two parts and a binary file is located between the two parts of boot code is used as an example.

Figure 4:
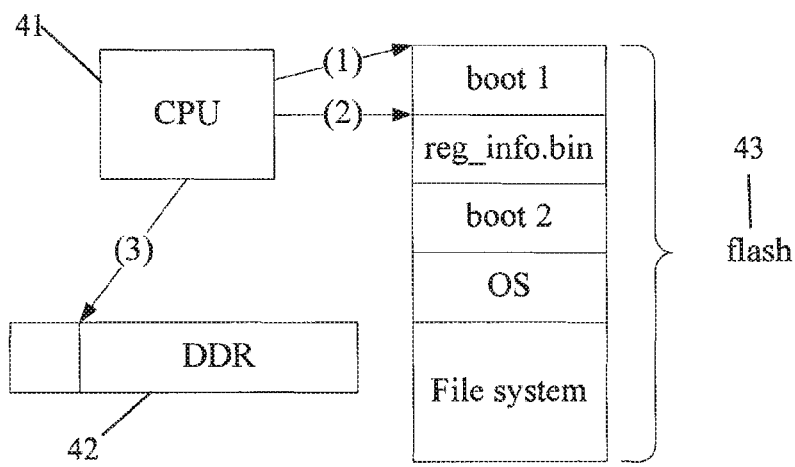
FIG. 4 is a schematic structural diagram of a system corresponding to FIG. 3.

FIG. 4 is a schematic structural diagram of a system corresponding to FIG. 3. The system includes a CPU 41, a DDR 42, and a flash 43. A boot image file is saved in the flash 43, and the boot image file includes universal boot code and differentiating boot code. In this embodiment, that the universal boot code is divided into two parts is used as an example, where the two parts are represented by boot 1 and boot 2, and the differentiating boot code is represented by reg_info.bin. It can be understood that an OS image file may be further saved in the flash 43, where the OS image file is a file that is obtained by compiling OS code and can be executed by a CPU, or another image file, for example, an image file of a file system. Boot 1 and boot 2 are configurable as long as it is ensured that at least indication information of the differentiating boot code is recorded in boot 1. In this embodiment, that boot 1 is used to record the indication information of the differentiating boot code and boot 2 is used to complete necessary hardware configuration is used as an example.

When the boot image file is compiled, a blank space may be reserved between boot 1 and boot 2, where a start address and a length are specified, and after reg_info.bin is obtained, reg_info.bin is inserted into the blank space between boot 1 and boot 2. That is, in this embodiment, boot 1 is stored as a continuous whole, boot 2 is also stored as a continuous whole, but boot 1 and boot 2 are stored non-contiguously; and reg_info.bin is stored as a continuous whole, and reg_info.bin is located in a place between boot 1 and boot 2, so that boot 1, reg_info.bin, and boot 2 are stored contiguously in order.

Reg_info.bin may be obtained by compiling differentiating code. The universal boot code may be obtained by compiling universal code using an Excel form, and the differentiating boot code may be obtained by compiling differentiating code using an Excel form. Then, the differentiating boot code (reg_info.bin) and the universal boot code (including boot 1 and boot 2) are programmed into the flash 43 together.

Referring to FIG. 3, this embodiment includes the following steps:

31: After being powered on, a CPU reads boot 1 from a set location in a flash and runs boot 1.

This step is shown in (1) in FIG. 4.

The set location may be a default location in the flash, for example, reading is generally started from an address 0 by default, and a start location of boot 1 is also the address 0. Therefore, the CPU may read boot 1 by starting with the address 0 and run boot 1.

By reading and running boot 1, preliminary configuration of the CPU can be completed, and information is provided for subsequent parsing differentiating boot code.

32: The CPU reads differentiating boot code reg_info.bin from the flash according to boot 1, and runs the differentiating boot code reg_info.bin. The differentiating boot code is at least used to complete initialization of a DDR, and may be further used for configuration and initialization of other hardware.

This step is shown in (2) in FIG. 4.

boot 1 Boot 1 may include indication information of reg_info.bin, and the CPU may read reg_info.bin according to boot 1, and run reg_info.bin.

For content of the initialization of the DDR, refer to the specific content of step 14.

The configuration and initialization of other hardware include, for example, mode switching of the CPU, configuration of a general-purpose register, and initialization of a flash controller.

The mode switching of the CPU may include switching of a mode of the CPU from a super protection (SVC32) mode to a slow mode, and then from the slow mode to a normal mode. The configuration of the general-purpose register may include configuration of a pin, starting a clock, starting power supply, and the like. The initialization of the flash controller may include reset cancellation, starting a clock, and the like.

33: After at least initialization of a DDR is completed, the CPU copies a boot image file (boot 1+reg_info.bin+boot 2) in the flash to the DDR, and runs boot 2; and after running boot 2, the CPU copies an OS image file in the flash to the DDR, and runs the OS image file, to start an operation system.

This step is shown in (3) in FIG. 4.

The CPU may drive a flash controller to copy the image files (including the boot image file and the OS image file) from the flash to the DDR.

Information about an entry of boot 2 may be recorded in boot 1, or it may be preconfigured that the first several pieces of code of boot 2 can be directly executed. Therefore, boot 2 can be run according to the record in boot 1 or the directly executable code. Necessary initialization of some hardware, for example, initialization of a serial port and a network port, can be completed by running boot 2.

Indication information of the OS image file may be recorded in boot 2; after running boot 2, the CPU may read the OS image file from the flash to the DDR according to the indication information of the OS image file recorded in boot 2, and run the OS image file, to start the OS.

In this embodiment, reg_info.bin and universal boot code (boot 1+boot 2) are separated, where reg_info.bin is obtained by compiling differentiating code that is of a chip including the code and differentiates the chip from other chips, and the universal boot code is obtained by compiling universal code of different chips, which can ensure that the different chips have same universal boot code (boot 1+boot 2). In this way, for different chips, only differentiating boot code reg_info.bin needs to be maintained, and only one piece of universal boot code (boot 1+boot 2) needs to be maintained, which can reduce maintenance costs and reduce an error rate.

Figure 5:
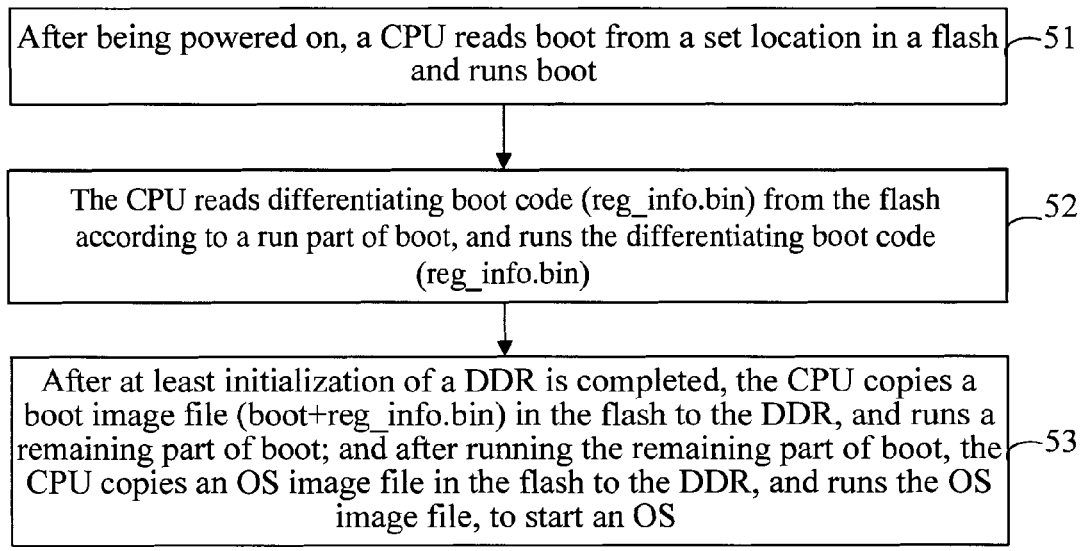
FIG. 5 is a schematic flowchart of another method for starting a chip according to an embodiment of the present invention.

FIG. 5 is a schematic flowchart of another method for starting a chip according to an embodiment of the present invention. In this embodiment, that boot code is a whole is used as an example.

Figure 6:
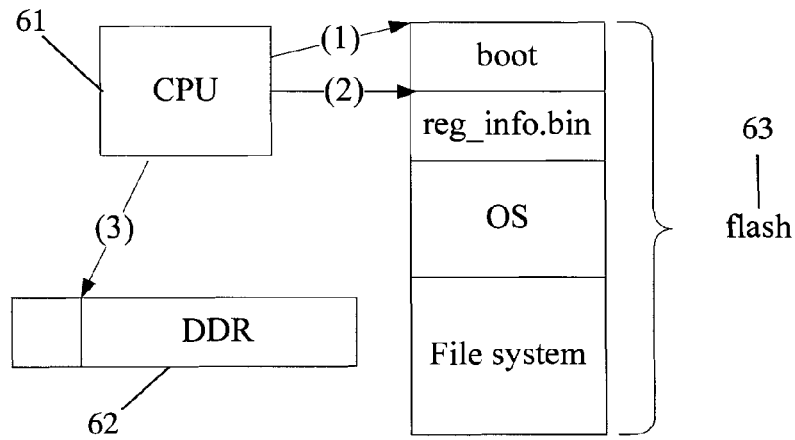
FIG. 6 is a schematic structural diagram of a system corresponding to FIG. 5.

FIG. 6 is a schematic structural diagram of a system corresponding to FIG. 5. The system includes a CPU 61, a DDR 62, and a flash 63. A boot image file is saved in the flash 63, and the boot image file includes universal boot code and differentiating boot code. In this embodiment, that the universal boot code includes a part is used as an example, where the part is represented by boot, and the differentiating boot code is represented by reg_info.bin. That is, in this embodiment, boot is stored as a continuous whole, and reg_info.bin is stored as a continuous whole, so that boot and reg_info.bin are stored contiguously in order.

It can be understood that an OS image file may be further saved in the flash 63, where the OS image file is a file that is obtained by compiling OS code and can be executed by a CPU, or another image file, for example, an image file of a file system, for example, code of the file system.

The universal boot code may be obtained by compiling universal code using an Excel form, and the differentiating boot code may be obtained by compiling differentiating code using an Excel form. Then, the differentiating boot code (reg_info.bin) and the universal boot code (boot) are programmed into the flash together.

Referring to FIG. 5, this embodiment includes the following steps:

51: After being powered on, a CPU reads boot from a set location in a flash and runs boot.

This step is shown in (1) in FIG. 6.

The set location may be information about a default location in the CPU, for example, reading is generally started from an address 0 by default, and a start location of boot is also the address 0. Therefore, the CPU may read boot by starting with the address 0 and run boot.

In this case, a part of the entire boot may be run, where the part can complete preliminary configuration of the CPU, and differentiating boot code reg_info.bin may be run according to the part.

52: The CPU reads the differentiating boot code reg_info.bin from the flash according to a run part of boot, and runs the differentiating boot code reg_info.bin. The differentiating boot code is at least used to complete initialization of a DDR, and may be further used for configuration and initialization of other hardware.

This step is shown in (2) in FIG. 6.

The run part of boot may include indication information of reg_info.bin, and the CPU may read reg_info.bin according to the run part of boot and run reg_info.bin.

Information about an ending may be recorded in boot. After boot is read from the set location and run, the code may be executed in order until the code indicates the ending, and boot before the ending is the foregoing run part of boot.

The run part of boot and a remaining part of boot may be similar to boot 1 and boot 2 in the foregoing embodiment. The two parts are also configurable as long as it is ensured that the run part of boot at least includes the indication information of the differentiating boot code. In this embodiment, that the run part of boot is used to record the indication information of the differentiating boot code and the remaining part of boot is used to complete necessary hardware configuration is used as an example.

For content of the initialization of the DDR, refer to the specific content of step 14.

For configuration and initialization of other hardware, refer to the specific content of step 32.

53: After at least initialization of a DDR is completed, the CPU copies a boot image file (boot+reg_info.bin) in the flash to the DDR, and runs a remaining part of boot; and after running the remaining part of boot, the CPU copies an OS image file in the flash to the DDR, and runs the OS image file, to start an OS.

This step is shown in (3) in FIG. 6.

The CPU may drive a flash controller to copy the image files (including the boot image file and the OS image file) from the flash to the DDR.

Information about an entry of the other part of boot that is not run (that is, the remaining part of boot) may be recorded in the run part of boot in 51, or it may be preconfigured that the first several pieces of code of the remaining part of boot can be executed directly. Therefore, the remaining part of boot can be run according to the record in the run part of boot or the directly executable code. Necessary initialization of some hardware, for example, initialization of a serial port and a network port, can be completed by running the remaining part of boot.

Indication information of the OS image file may be recorded in the remaining part of boot; after running the remaining part of boot, the CPU may read the OS image file from the flash to the DDR according to the indication information of the OS image file recorded in the remaining part of boot, and run the OS image file, to start the OS.

In this embodiment, reg_info.bin and universal boot code are separated, where reg_info.bin is obtained by compiling differentiating code that is of a chip including the code and differentiates the chip from other chips, and the universal boot code is obtained by compiling universal code of different chips, which can ensure that different chips have same universal boot code. In this way, for different chips, only differentiating boot code reg_info.bin needs to be maintained, and only one piece of universal boot code needs to be maintained, which can reduce maintenance costs and reduce an error rate.

Figure 7:
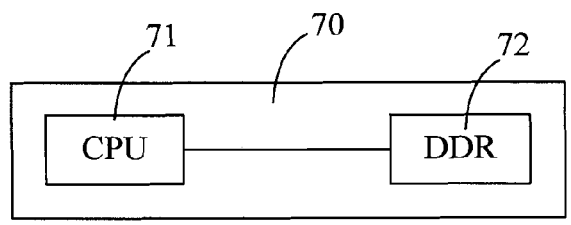
FIG. 7 is a schematic structural diagram of a chip according to an embodiment of the present invention.

FIG. 7 is a schematic structural diagram of a chip according to an embodiment of the present invention. The chip 70 includes a CPU 71. The CPU 71 is configured to, after being powered on, obtain a boot image file, where the boot image file includes universal boot code and differentiating boot code, the universal boot code is obtained by compiling a universal part in boot code of different chips, the universal boot code includes a first boot code segment and a second boot code segment, and the differentiating boot code is obtained by compiling a differentiating part that is in boot code of the chip to which the CPU belongs and differentiates the chip from other chips; read the first boot code segment from the boot image file, and run the first boot code segment; read, from the first boot code segment, indication information of the differentiating boot code; read, from the boot image file, the differentiating boot code according to the indication information of the differentiating boot code, and run the differentiating boot code; and run the second boot code segment, to complete booting of the chip to which the CPU belongs.

Optionally, the differentiating boot code is at least used to initialize a DDR, and the chip further includes a DDR 72, where the DDR 72 is configured to complete initialization according to the differentiating boot code; and the CPU 71 is configured to, after the DDR 72 is initialized, read the second boot code segment to the DDR 72 and run the second boot code segment.

Optionally, the second boot code segment includes indication information of an OS image file, where the OS image file is used to start an OS; and the CPU 71 is configured to obtain, from the second boot code segment, the indication information of the OS image file, read the OS image file to the DDR 72 according to the indication information of the OS image file, and run the OS image file.

Optionally, the CPU 71 is further configured to, after the DDR 72 is initialized, read the first boot code segment, the differentiating boot code, and the second boot code segment to the DDR 72, to jointly complete booting of the chip to which the CPU 71 belongs.

Optionally, the first boot code segment and the second boot code segment are stored non-contiguously, and the differentiating boot code is stored in a place between the first boot code segment and the second boot code segment; or the first boot code segment and the second boot code segment are stored contiguously.

Optionally, the boot image file and the OS image file may be stored in a flash.

In this embodiment, for different chips, differentiating code is separated from boot code, and only universal code of the different chips is saved in the boot code. In this way, chips in a same product field or even multiple types of chips of a same manufacturer can share a same piece of boot code. Therefore, the number of pieces of to-be-maintained code is reduced, maintenance costs are reduced, and an error probability is reduced.

It may be clearly understood by a person skilled in the art that, for the purpose of convenient and brief description, division of the foregoing function modules is merely used as an example for description. In actual application, the foregoing functions can be allocated to different function modules and implemented according to a requirement, that is, an internal structure of an apparatus is divided into different function modules to implement all or part of the functions described above. For a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or a part of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present application.

What is claimed is:

1. A method for starting a chip, used to start a specific chip, wherein the specific chip comprises a central processing unit (CPU), the method comprising:
    obtaining, by the CPU, a boot image file after the chip is powered on, wherein the boot image file comprises a universal boot code and a differentiating boot code, wherein the universal boot code is obtained by compiling a universal part that is in a boot code of the specific chip and is also applicable to other chips, wherein the universal boot code comprises a first boot code segment and a second boot code segment, wherein the differentiating boot code is obtained by compiling a differentiating part that is in the boot code of the specific chip and differentiates the specific chip from other chips, and wherein indication information of the differentiating code is recorded in the first boot code segment;
    reading, by the CPU, the first boot code segment from the boot image file;
    running the first boot code segment;
    reading, by the CPU and from the first boot code segment, the indication information of the differentiating boot code;
    reading, by the CPU and from the boot image file, the differentiating boot code according to the indication information of the differentiating boot code;
    running the differentiating boot code; and
    running, by the CPU, the second boot code segment, to complete booting of the specific chip.

2. The method according to claim 1, wherein the differentiating boot code is used to initialize a double data rate synchronous dynamic random access memory (DDR), and after reading and running the differentiating boot code, the method further comprise completing, by the DDR, initialization according to the run differentiating boot code, and wherein running, by the CPU, the second boot code segment comprises:
    reading, after the DDR is initialized, by the CPU, the second boot code segment to the DDR; and
    running the second boot code segment.

3. The method according to claim 2, wherein the second boot code segment comprises the indication information of an operating system (OS) image file, wherein the OS image file is used to start an OS, wherein reading, by the CPU, the second boot code segment to the DDR, and running the second boot code segment comprises obtaining, by the CPU and from the second boot code segment, the indication information of the OS image file, and wherein, after reading, by the CPU, the second boot code segment to the DDR, and running the second boot code segment, the method further comprises:
    reading, by the CPU, the OS image file to the DDR according to the indication information of the OS image file; and
    running the OS image file.

4. The method according to claim 2, wherein before running, by the CPU, the second boot code segment, the method further comprises reading, by the CPU and after the DDR is initialized, the first boot code segment and the differentiating boot code to the DDR to complete booting of the chip to which the CPU belongs using the first boot code segment, the second boot code segment, and the differentiating boot code together.

5. The method according to claim 1, wherein the first boot code segment and the second boot code segment are stored non-contiguously, and wherein the differentiating boot code is stored in a place between the first boot code segment and the second boot code segment.

6. The method according to claim 1, wherein the first boot code segment and the second boot code segment are stored contiguously.

7. A chip comprising a central processing unit (CPU), wherein the CPU is configured to:
    obtain, after being powered on, a boot image file, wherein the boot image file comprises a universal boot code and a differentiating boot code, wherein the universal boot code is obtained by compiling a universal part that is in a boot code of a specific chip and is also applicable to other chips, wherein the universal boot code comprises a first boot code segment and a second boot code segment, wherein the differentiating boot code is obtained by compiling a differentiating part that is in the boot code of the specific chip and differentiates the specific chip from other chips, and wherein indication information of the differentiating code is recorded in the first boot code segment;
    read the first boot code segment from the boot image file;
    run the first boot code segment;
    read, from the first boot code segment, the indication information of the differentiating boot code;
    read, from the boot image file, the differentiating boot code according to the indication information of the differentiating boot code;
    run the differentiating boot code; and
    run the second boot code segment, to complete booting of the chip.

8. The chip according to claim 7, wherein the differentiating boot code is used to initialize a double data rate synchronous dynamic random access memory (DDR), wherein the chip further comprises a DDR configured to complete initialization according to the run differentiating boot code, and wherein the CPU is specifically configured to:
    read, after the DDR is initialized, the second boot code segment to the DDR; and
    run the second boot code segment.

9. The chip according to claim 8, wherein the second boot code segment comprises indication information of an operating system (OS) image file, and the OS image file is used to start an OS, and wherein the CPU is specifically configured to:
 obtain, from the second boot code segment, the indication information of the OS image file;
 read the OS image file to the DDR according to the indication information of the OS image file; and
 run the OS image file.

10. The chip according to claim 8, wherein the CPU is further configured to read the first boot code segment and the differentiating boot code to the DDR, after the DDR is initialized, to complete booting of the chip to which the CPU belongs using the first boot code segment, the second boot code segment, and the differentiating boot code together.

11. The chip according to claim 7, wherein the first boot code segment and the second boot code segment are stored non-contiguously, and wherein the differentiating boot code is stored in a place between the first boot code segment and the second boot code segment.

12. The chip according to claim 7, wherein the first boot code segment and the second boot code segment are stored contiguously.

\* \* \* \* \*